(12) United States Patent
Liu et al.

(10) Patent No.: US 10,158,471 B2
(45) Date of Patent: Dec. 18, 2018

(54) DEMODULATION REFERENCE SIGNAL PROCESSING METHOD, BASE STATION AND USER EQUIPMENT

(71) Applicant: Huawei Technologies Co., Ltd., Shenzhen, Guangdong (CN)

(72) Inventors: Kunpeng Liu, Beijing (CN); Jianghua Liu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 356 days.

(21) Appl. No.: 14/448,187

(22) Filed: Jul. 31, 2014

(65) Prior Publication Data
US 2014/0341180 A1 Nov. 20, 2014

Related U.S. Application Data

(63) Continuation of application No. PCT/CN2013/071266, filed on Feb. 1, 2013.

(30) Foreign Application Priority Data

Feb. 1, 2012 (CN) .......................... 2012 1 0022525

(51) Int. Cl.
*H04W 4/00* (2018.01)
*H04L 5/00* (2006.01)
(Continued)

(52) U.S. Cl.
CPC .......... *H04L 5/0051* (2013.01); *H04L 5/0005* (2013.01); *H04L 27/2613* (2013.01);
(Continued)

(58) Field of Classification Search
CPC .................. H04L 15/0051; H04L 5/0005
See application file for complete search history.

(56) References Cited

U.S. PATENT DOCUMENTS

2009/0110038 A1   4/2009  Montojo et al.
2011/0237267 A1*  9/2011  Chen ...................... H04J 11/003
                                              455/450
(Continued)

FOREIGN PATENT DOCUMENTS

CN   102055689 A   5/2011
CN   102170624 A   8/2011
(Continued)

OTHER PUBLICATIONS

"E-PDCCH Design Aspects Related to Reference Signals," 3GPP TSG RAN WG1 Meeting #68, Dresden, Germany, R1-120254, 3$^{rd}$ Generation Partnership Project, Valbonne, France (Feb. 6-10, 2012).
(Continued)

*Primary Examiner* — Samina Choudhry
(74) *Attorney, Agent, or Firm* — Leydig, Voit & Mayer, Ltd.

(57) ABSTRACT

The embodiments of the present invention provide a demodulation reference signal processing method, a base station and a user equipment. A processing method includes: generating, by a base station, a DMRS corresponding to an E-PDCCH by using information that is available before a UE receives the E-PDCCH sent by the base station; and mapping, by the base station, the DMRS onto a time-and-frequency resource corresponding to a downlink control channel region and used for transmitting a reference signal, and sending the DMRS to the UE. In the technical solutions of the embodiments of the present invention, the base station and the UE no longer use an SCID for generating the DMRS, which solves the problem that the UE cannot obtain the SCID before receiving the E-PDCCH and cannot generate the DMRS, and further, cannot demodulate the E-PDCCH, and enables demodulation of the E-PDCCH.

16 Claims, 5 Drawing Sheets

---

A base station generates a DMRS corresponding to an E-PDCCH by using information that is available before a UE receives the E-PDCCH sent by the base station — 101

The base station maps the DMRS onto a time-and-frequency resource corresponding to a downlink control channel region and used for transmitting a reference signal, and sends the DMRS to the UE — 102

(51) Int. Cl.
*H04L 27/26* (2006.01)
*H04W 72/04* (2009.01)
*H04L 25/02* (2006.01)

(52) U.S. Cl.
CPC ......... *H04W 72/042* (2013.01); *H04L 5/0007* (2013.01); *H04L 5/0053* (2013.01); *H04L 25/0224* (2013.01)

(56) References Cited

U.S. PATENT DOCUMENTS

| | | |
|---|---|---|
| 2011/0237283 A1 | 9/2011 | Shan et al. |
| 2013/0039284 A1* | 2/2013 | Marinier ................. H04L 5/001 370/329 |
| 2013/0083769 A1* | 4/2013 | Qu ........................ H04L 5/0016 370/330 |
| 2013/0114565 A1* | 5/2013 | Chen ..................... H04L 5/0053 370/330 |

FOREIGN PATENT DOCUMENTS

| | | |
|---|---|---|
| RU | 2451404 C2 | 5/2012 |
| WO | 2012146095 A1 | 11/2012 |

OTHER PUBLICATIONS

"Downlink DMRS enhancement for CoMP," 3GPP TSG RAN WG1 Meeting #67, San Francisco, USA, R1-113822, pp. 1-5, 3rd Generation Partnership Project, Valbonne, France (Nov. 14-18, 2011).

"Consideration for DMRS enhancement in CoMP," 3GPP TSG RAN WG1 Meeting #67, San Francisco, USA, 1-113765, pp. 1-6, 3rd Generation Partnership Project, Valbonne, France (Nov. 14-18, 2011).

* cited by examiner

DEMODULATION REFERENCE SIGNAL PROCESSING METHOD, BASE STATION AND USER EQUIPMENT

CROSS-REFERENCE TO RELATED APPLICATIONS

This application is a continuation of International Patent Application No. PCT/CN2013/071266, filed Feb. 1, 2013, which claims priority to Chinese Patent Application No. 201210022525.6, filed Feb. 1, 2012, both of which are hereby incorporated by reference in their entireties.

TECHNICAL FIELD

The embodiments of present invention relate to a mobile communications technology, and in particular, to a demodulation reference signal processing method, a base station and a user equipment.

BACKGROUND

In a T3rd Generation Partnership Project (3GPP) Long Term Evolution (LTE) communications system, time-and-frequency resources in each downlink subframe are divided into two regions: a downlink control channel region and a downlink data channel region. The downlink control channel region occupies the first N orthogonal frequency division multiplexing (OFDM) symbols, where N is less than or equal to 3, and the downlink data channel region occupies the remaining OFDM symbols. A physical downlink control channel (PDCCH) is used to transmit scheduling indication signaling for user uplink or downlink data transmission, for example, information related to data channel resource allocation, a modulation and coding scheme, multi-antenna transmission, a hybrid automatic repeat request (HARQ) process, and so on. The PDCCHs of multiple users share the time-and-frequency resources of the downlink control channel region. A physical downlink shared channel (PDSCH) is used to transmit user downlink data, and occupies the time-and-frequency resources of the downlink data channel region.

Because both uplink and downlink data scheduling of each user needs to be indicated by the PDCCH, the capacity of the downlink control channel region is a key factor affecting the number of users that can be scheduled in a cell simultaneously. A coordinated multi-point (CoMP) scheduling mechanism and a more flexible multi-user multi-input multi-output (MU-MIMO) scheduling mechanism are introduced, so as to provide higher spectrum efficiency and cell edge user performance, and significantly increase the number of users that can be simultaneously served by the cell. As a result, the downlink control channel region of three OFDM symbols in the LTE system cannot meet requirements, and therefore, an extended PDCCH (E-PDCCH) emerges for transmitting scheduling indication signaling for uplink or downlink data transmission of more users. The E-PDCCH occupies some time-and-frequency resources of the downlink data channel region, and shares the time-and-frequency resources of the downlink data channel region with the PDSCH by using frequency division multiplexing (FDM), or by using time division multiplexing (TDM) together with frequency division multiplexing.

The E-PDCCH performs demodulation based on a demodulation reference signal (DMRS), and the DMRS is specific to a user equipment (UE). An initial value of the DMRS is determined according to both a cell identifier (Cell ID) and a scrambling identifier (SCID). For the E-PDCCH, the SCID and the E-PDCCH are notified together to a UE. As a result, the UE cannot know the SCID beforehand, and cannot know the DMRS required for demodulating the E-PDCCH, and therefore cannot demodulate the E-PDCCH.

SUMMARY

The embodiments of the present invention provide a demodulation reference signal processing method, a base station and a user equipment, which are used to provide a DMRS required for demodulating an E-PDCCH and implementing successful demodulation of the E-PDCCH.

One aspect of the embodiments of the present invention provides a demodulation reference signal processing method, including:

generating, by a base station, a DMRS corresponding to an E-PDCCH according to information that is available before a user equipment UE receives the extended physical downlink control channel E-PDCCH sent by the base station; and mapping, by the base station, the DMRS onto a time-and-frequency resource corresponding to a downlink control channel region and used for transmitting a reference signal, and sending the DMRS to the UE.

In one aspect, the embodiments of the present invention provide a base station, including:

a first generating module, configured to generate a DMRS corresponding to an E-PDCCH according to information that is available before a user equipment UE receives the extended physical downlink control channel E-PDCCH sent by the base station; and a sending module, configured to map the DMRS generated by the first generating module onto a time-and-frequency resource corresponding to a downlink control channel region and used for transmitting a reference signal, and send the DMRS to the UE.

In another aspect, the embodiments of the present invention provide a demodulation reference signal processing method, including:

generating, by a user equipment UE, a DMRS corresponding to an E-PDCCH by using information that is available before receiving the extended physical downlink control channel E-PDCCH sent by a base station; and detecting, by the UE, the E-PDCCH according to the DMRS.

In another aspect, the embodiments of the present invention provide a user equipment, including:

a third generating module, configured to generate a DMRS corresponding to an E-PDCCH by using information that is available before receiving the extended physical downlink control channel E-PDCCH sent by a base station; and a detecting module, configured to detect the E-PDCCH according to the DMRS generated by the third generating module.

According to the demodulation reference signal processing method and the base station provided in one aspect of the embodiments of the present invention, according to information that is available before the UE receives the E-PDCCH sent by the base station, the base station generates a DMRS required for demodulating the E-PDCCH and then sends the DMRS to the UE. In this way, the UE can generate the DMRS with the corresponding information before receiving the E-PDCCH, and demodulate the E-PDCCH according to the generated DMRS. The information used by the base station and the UE for generating the DMRS is no longer an SCID, which solves the problem that the UE cannot obtain the SCID before receiving the E-PDCCH and cannot generate the DMRS, and further, cannot demodulate the E-PDCCH, and solves the issue of demodulating the E-PDCCH.

According to the demodulation reference signal processing method and the user equipment provided in another aspect of the embodiments of the present invention, the UE collaborates with the base station, and, by using the information that is available before receiving the E-PDCCH sent by the base station, generates a DMRS required for demodulating the E-PDCCH and then demodulates the E-PDCCH according to the generated DMRS. The information used by the base station and the UE for generating the DMRS is no longer an SCID, which solves the problem that the UE cannot obtain the SCID before receiving the E-PDCCH and cannot generate the DMRS, and further, cannot demodulate the E-PDCCH, and solves the issue of demodulating the E-PDCCH.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and persons of ordinary skill in the art may still derive other drawings from these accompanying drawings without creative efforts.

DESCRIPTION OF EMBODIMENTS

To make the objectives, technical solutions, and advantages of the embodiments of the present invention more comprehensible, the following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Figure 1:
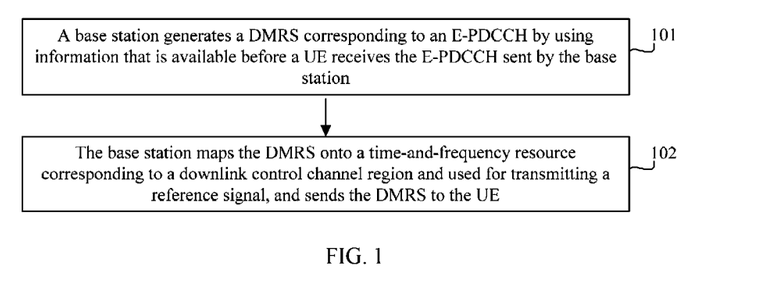
FIG. 1 is a flowchart of a DMRS processing method according to an embodiment of the present invention.

FIG. 1 is a flowchart of a DMRS processing method according to an embodiment of the present invention. As shown in FIG. 1, the method in this embodiment includes:

Step 101: A base station generates a DMRS corresponding to an E-PDCCH by using information that is available before a UE receives the E-PDCCH sent by the base station.

To solve the problem that the UE cannot obtain an SCID before receiving the E-PDCCH and cannot use the SCID and a cell ID to generate the DMRS for demodulating the E-PDCCH, the base station in this embodiment no longer uses the SCID to generate the E-PDCCH, but uses the information that is available before the UE receives the E-PDCCH, for example, the cell ID or a radio network temporary identifier (RNTI), to generate the DMRS required for demodulating the E-PDCCH. The information may be any information that is available before the UE receives the E-PDCCH.

The DMRS of this embodiment refers to the DMRS generated by the base station and required for demodulating the E-PDCCH.

Step 102: The base station maps the DMRS onto a time-and-frequency resource corresponding to a downlink control channel region and used for transmitting a reference signal, and sends the DMRS to the UE.

Specifically, the base station generates the DMRS only when an E-PDCCH needs to be sent. After generating the DMRS, the base station maps the DMRS onto a time-and-frequency resource corresponding to a downlink control channel region and used for transmitting a reference signal, and sends the DMRS to the UE. In this embodiment, the base station may use frequency division multiplexing or use both time division multiplexing and frequency division multiplexing to map the E-PDCCH onto the time-and-frequency resource existent in a downlink data channel region and used for transmitting the reference signal.

It is hereby noted that the downlink control channel region mentioned in this embodiment refers to the downlink control channel region in the prior art, that is, the time-and-frequency resource primarily intended for carrying the PDCCH of the user; and the downlink data channel region mentioned in this embodiment refers to the downlink data channel region in the prior art, that is, the time-and-frequency resource primarily intended for carrying the PDSCH of the user.

In this embodiment, the base station no longer uses the SCID to generate the DMRS required for demodulating the E-PDCCH, but generates the DMRS by using the information that is available before the UE receives the E-PDCCH; correspondingly, the UE also generates the DMRS before receiving the E-PDCCH based on the information that is available before receiving the E-PDCCH. In this way, the E-PDCCH is demodulated based on the generated DMRS, the defect that the UE cannot generate the DMRS based on the SCID in the same way as the prior art is overcome, and the issue of demodulating the E-PDCCH is solved.

Figure 2:
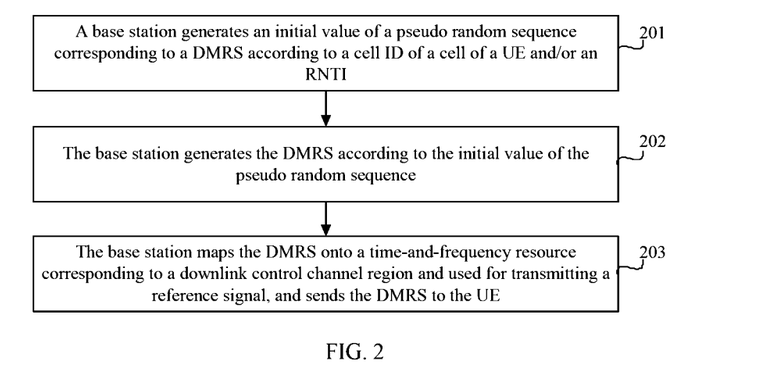
FIG. 2 is a flowchart of a DMRS processing method according to another embodiment of the present invention.

FIG. 2 is a flowchart of a DMRS processing method according to another embodiment of the present invention. As shown in FIG. 2, the method in this embodiment includes:

Step 201: A base station generates an initial value of a pseudo random sequence corresponding to a DMRS according to a cell ID of a cell of a UE and/or an RNTI.

Step 202: The base station generates the DMRS according to the initial value of the pseudo random sequence.

In the example given in this embodiment, the base station uses the information that is available before the UE receives the E-PDCCH as a cell ID and/or an RNTI to generate the DMRS required for demodulating the E-PDCCH, but the used information is not limited to that. The RNTI may be, but without being limited to, a cell radio network temporary identifier (Cell RNTI, C-RNTI), a system message radio network temporary identifier (System Information RNTI, SI-RNTI), a paging radio network temporary identifier (Paging RNTI, P-RNTI), a random access radio network temporary identifier (Random Access RNTI, RA-RNTI), a transmit power control-physical uplink control channel radio network temporary identifier (Transmit Power Control-Physical Uplink Control Channel-RNTI, TPC-PUCCH-RNTI), or a transmit power control-physical uplink shared channel radio network temporary identifier (Transmit Power Control-Physical Uplink Shared Channel-RNTI, TPC-PUSCH-RNTI).

Specifically, the base station generates a first DMRS according to formula (1).

$$r(m) = \frac{1}{\sqrt{2}}(1 - 2 \cdot c(2m)) + j\frac{1}{\sqrt{2}}(1 - 2 \cdot c(2m + 1)) \quad (1)$$

where $r(m)$ represents a DMRS sequence, $m=0, 1, \ldots, 12N_{RB}^{DL}-1$, and c represents a pseudo random sequence; $N_{RB}^{DL}$ is the number of resource blocks included in a maximum system bandwidth, or the number of resource blocks included in a bandwidth occupied by the reference signal corresponding to the E-PDCCH, that is, DMRS.

If $N_{RB}^{DL}$ is the number of resource blocks included in the maximum system bandwidth, the base station generates the DMRS according to the maximum system bandwidth, that is, the base station generates a DMRS of a length corresponding to the maximum system bandwidth.

If $N_{RB}^{DL}$ is the number of resource blocks included in the bandwidth occupied by the reference signal corresponding to the E-PDCCH, the base station generates the DMRS according to the bandwidth occupied by the DMRS corresponding to the E-PDCCH, that is, the base station generates a DMRS of a length corresponding to the bandwidth occupied by the reference signal corresponding to the E-PDCCH.

In this embodiment, the base station generates an initial value of a pseudo random sequence c according to a cell ID of a cell of the UE and/or an RNTI.

For example, the base station may generate the initial value of the pseudo random sequence c corresponding to the DMRS according to formula (2).

$$c_{init} = \lfloor n_s/2 \rfloor 2^9 + N_{ID}^{cell} \quad (2)$$

where is the initial value of the pseudo random sequence c corresponding to the DMRS; and $n_s$ is a sequence number of a transmission slot corresponding to the DMRS, that is, the sequence number of the slot for transmitting the DMRS; and $N_{ID}^{cell}$ is the cell ID of the cell of the UE.

For another example, the base station may generate the initial value of the pseudo random sequence c corresponding to the DMRS according to formula (3).

$$c_{init} = (\lfloor n_s/2 \rfloor + 1) \cdot (2N_{ID}^{cell} + 1) \cdot 2^9 + N_{ID}^{cell} \quad (3)$$

Formula (2) and formula (3) include only the ID of the cell of the UE, which means that the base station uses only the cell ID to scramble the pseudo random sequence c and generate the initial value of the pseudo random sequence c.

For another example, the base station may also generate the initial value of the pseudo random sequence c corresponding to the DMRS according to formula (4).

$$c_{init} = (\lfloor n_s/2 \rfloor + 1) \cdot (2N_{ID}^{cell} + 1) \cdot 2^{16} + n_{RNTI} \quad (4)$$

Formula (4) includes both the cell ID and the RNTI, and the base station uses the RNTI to scramble the pseudo random sequence and generate the initial value of the pseudo random sequence c.

It is hereby noted that in formula (2) to formula (4), $\lfloor n_s/2 \rfloor$ refers to rounding down a quotient obtained by dividing the slot sequence number by 2.

After generating the initial value of the pseudo random sequence c corresponding to the DMRS according to formula (2) or (3) or (4), the base station generates the DMRS according to formula (1).

The base station may also use a variation of formula (2) or (3) or (4) other than formulas (2) to (4) to generate the initial value of the pseudo random sequence. In addition, the base station may also use only the RNTI to generate the initial value of the pseudo random sequence.

Step 203: The base station maps the DMRS onto a time-and-frequency resource corresponding to a downlink control channel region and used for transmitting a reference signal, and sends the DMRS to the UE.

If the base station generates the DMRS according to the maximum system bandwidth, the base station intercepts a corresponding sequence in the DMRS according to a resource location of the DMRS, maps the intercepted sequence onto the time-and-frequency resource corresponding to the downlink control channel region and used for transmitting the reference signal, and sends the mapped sequence to the UE.

If the base station generates the DMRS according to the bandwidth occupied by the DMRS corresponding to the E-PDCCH, the base station directly maps the generated DMRS onto the time-and-frequency resource corresponding to the downlink control channel region and used for transmitting the reference signal, and sends the DMRS to the UE.

In this embodiment, the base station generates an initial value of a pseudo random sequence corresponding to the DMRS according to the cell ID of the cell of the UE and/or the RNTI, and generates the DMRS according to the initial value of the pseudo random sequence. The used cell ID and/or RNTI is information that is available before the UE receives the E-PDCCH. Therefore, by using a generation manner that is the same as the generation manner of the base station, the UE can generate the DMRS before receiving the E-PDCCH, which lays a foundation for using the generated DMRS to demodulate the E-PDCCH successfully and solves the problem in the prior art that the UE cannot generate the DMRS according to the SCID and cannot demodulate the E-PDCCH.

Formulas (2), (3) and (4) vary from each other, and therefore, the initial value of the pseudo random sequence corresponding to the DMRS generated by the base station according to formula (2) or (3) or (4) also varies. The following embodiments provide several implementation manners for a base station to generate an initial value of a pseudo random sequence corresponding to a DMRS according to formula (2) or (3) or (4).

Figure 3A:
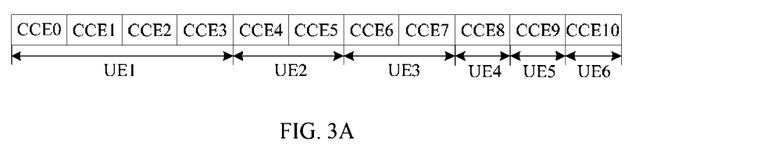
FIG. 3A is a schematic structural diagram of using CCEs to form PDCCHs of different users according to an embodiment of the present invention.

A first implementation manner for the base station to generate the initial value of the pseudo random sequence corresponding to the DMRS according to formula (2) or (3) or (4) is related to an aggregation level of the E-PDCCH. Before describing the aggregation level of the E-PDCCH, the following describes the aggregation level of the PDCCH in the prior art first. A Long Term Evolution (LTE) system defines a control channel element (CCE) as a PDCCH resource element, and each CCE is mapped onto a group of specific time-frequency lattice points in a downlink control channel region, that is, onto a resource element (RE). The PDCCH may be formed of 1, 2, 4, or 8 CCEs, which correspond to different coding rates respectively. That is, the PDCCH has four aggregation levels, and each aggregation level includes 1, 2, 3, or 4 CCEs. FIG. 3A shows a structure of using CCEs to form PDCCHs of different users, where a CCE 0 to a CCE 3 form the PDCCH of a UE 1; a CCE 4 to a CCE 5 form the PDCCH of a UE 2; a CCE 6 to a CCE 7 form the PDCCH of a UE 3; and a CCE 8, a CCE 9, and a CCE 10 form the PDCCH of a UE 4, a UE 5, and a UE 6 respectively. According to user channel conditions, the base station determines how many CCEs and which CCEs form the PDCCH of the user, and, after they are determined, the base station notifies them to the UE.

Similar to the PDCCH, the LTE system also defines an extended control channel element (E-CCE) for the E-PDCCH, and the E-PDCCH may also allocate resources by using the E-CCE as a unit. Each E-CCE is mapped onto a specific time-frequency lattice point in a downlink data channel region that carries the E-PDCCH. Multiple aggregation levels of the E-PDCCH are defined according to the number of E-CCEs that form the E-PDCCH. For example, there are k aggregation levels of the E-PDCCH, and the numbers of E-CCEs included in them are M1, M2, . . . , and Mk respectively.

Specifically, before sending the E-PDCCH to the UE, the base station determines the time-and-frequency resource used for sending the E-PDCCH, and therefore, determines the aggregation level of the E-PDCCH or an aggregation level of the UE that receives the E-PDCCH. For example, if the base station determines that the aggregation level of the E-PDCCH or the aggregation level of the UE that receives the E-PDCCH is i, the corresponding number of included E-CCEs is Mi, where 0<i≤k. The base station determining the time-and-frequency resource used for sending the E-PDCCH is also known as allocating E-CCEs that carry the E-PDCCH; if the time-and-frequency resource used for sending the E-PDCCH belongs to a specific E-CCE, it is deemed that this E-CCE is allocated for carrying the E-PDCCH.

Further, the base station may further divide all E-CCEs according to a preset granularity to form a resource set. For example, the base station divides the E-CCEs according to a granularity to form a physical resource block (PRB), a physical resource block pair (PRB pair), a precoding resource block group (PRG), a resource block group (RBG), or a CCE group (group). The PRB, the PRB pair, the PRG, the RBG, or the CCE group is the resource set.

Figure 3B:
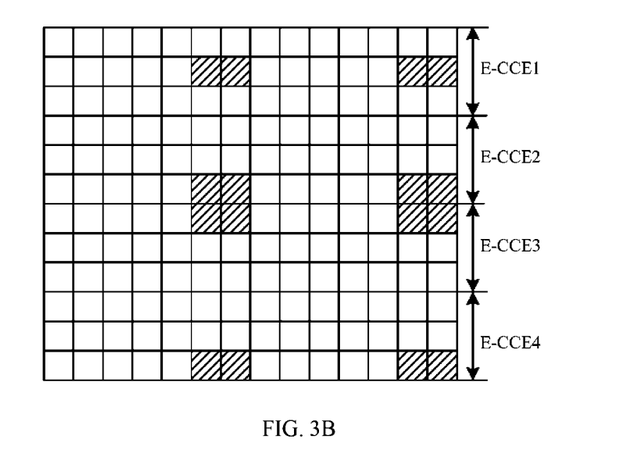
FIG. 3B is a schematic diagram of an E-CCE carrying an E-PDCCH in a control element group according to an embodiment of the present invention.

Based on above, after the base station allocates the E-CCE that carries the E-PDCCH, according to the location of each E-CCE and the range of each resource set, the base station can determine the resource set that includes the E-CCE carrying the E-PDCCH. The E-CCE carrying the E-PDCCH may be one E-CCE in the resource set or multiple E-CCEs in the resource set. As shown in FIG. 3B, a resource set includes four E-CCEs: an E-CCE 1, an E-CCE 2, an E-CCE 3, and an E-CCE 4. In FIG. 3B, the E-CCEs carrying the E-PDCCH include an E-CCE 1, an E-CCE 2, an E-CCE 3, and an E-CCE 4. The square indicated by the oblique lines in FIG. 3B represents the time-and-frequency resource used for transmitting the E-PDCCH.

Based on above, a first implementation manner for a base station to generate an initial value of a pseudo random sequence corresponding to a DMRS according to formula (2) or (3) or (4) includes:

generating, by the base station, the initial value of the pseudo random sequence corresponding to the DMRS according to formula (2) or formula (3) if the total number of E-CCEs included in the resource set is greater than the number of E-CCEs carrying the E-PDCCH and included in the resource set; and generating, by the base station, the initial value of the pseudo random sequence corresponding to the DMRS according to formula (4) if the total number of E-CCEs included in the resource set is less than or equal to the number of E-CCEs carrying the E-PDCCH and included in the resource set.

Using FIG. 3B as an example, the resource set includes four E-CCEs in total, and the number of E-CCEs carrying the E-PDCCH and included in the resource set is also 4, and therefore, the base station generates the initial value of the pseudo random sequence corresponding to the DMRS according to formula (4).

In this implementation manner, according to the aggregation level of the E-PDCCH, the base station uses different methods to calculate the initial value of the pseudo random sequence for the DMRS of the E-PDCCH transmitted in different time-and-frequency resources, which can reduce collision between the DMRSs transmitted over different time-and-frequency resources, reduce interference, improve performance of channel estimation, and improve demodulation performance of the E-PDCCH.

A second implementation manner for the base station to generate the initial value of the pseudo random sequence corresponding to the DMRS according to formula (2) or (3) or (4) is related to a space of a downlink control channel region that includes the E-CCE carrying the E-PDCCH. In an LTE system, a downlink control channel region is divided into a common search space and a user search space. The common search space is used to transmit scheduling indication signaling of common control information such as a system broadcast message, a paging message, an instant access message; and the user search space is used to transmit scheduling indication signaling of user uplink and downlink data transmission. The common search space fixedly includes CCEs numbered 0 to 15, and the CCEs of the user search space depend on the user ID and a PDCCH aggregation format. Similar to the downlink control channel region, the downlink control channel region carrying the E-PDCCH is also divided into a common search space and a user search space.

Based on above, a second implementation manner for a base station to generate an initial value of a pseudo random sequence corresponding to a DMRS according to formula (2) or (3) or (4) includes:

generating, by the base station, the initial value of the pseudo random sequence corresponding to the DMRS according to the formula (2) or (3) if the E-CCE carrying the E-PDCCH belongs to a common search space of the downlink control channel region that carries the E-PDCCH; and generating, by the base station, the initial value of the pseudo random sequence corresponding to the DMRS according to the formula (4) if the E-CCE carrying the E-PDCCH belongs to a user search space of the downlink control channel region that carries the E-PDCCH.

In this implementation manner, according to the search space of the downlink control channel region carrying the E-PDCCH, the base station uses different methods to calculate the initial value of the pseudo random sequence for the DMRS of the E-PDCCH transmitted in different search spaces, which can reduce collision between the DMRSs of the E-PDCCHs transmitted in different search spaces, reduce interference, improve performance of channel estimation, and improve demodulation performance of the E-PDCCH.

Further, for the E-PDCCHs of different downlink control information (DCI) formats, the base station may generate the corresponding DMRS for them by using different initial values of the pseudo random sequence. For example, the base station may pre-store a mapping relationship between each DCI format and the corresponding initial value of the pseudo random sequence. The base station determines the initial value of the pseudo random sequence used by the E-PDCCH according to the DCI format of the E-PDCCH if the DMRS is generated for E-PDCCHs of different DCI formats by using different initial values of the pseudo random sequence. Specifically, according to the DCI format of the E-PDCCH, the base station may determine which of formula (2) to formula (4) is used to generate the initial value of the pseudo random sequence used by the E-PDCCH.

Alternatively, according to the aggregation level of the E-PDCCH, the base station may generate the corresponding DMRS for the E-PDCCHs of different aggregation levels by using different initial values of the pseudo random sequence. For example, the base station may pre-store a mapping relationship between each aggregation level and the initial value of the pseudo random sequence. The base station determines the initial value of the pseudo random sequence used by the E-PDCCH according to the aggregation level of the E-PDCCH if the DMRS is generated for E-PDCCHs of different aggregation levels by using different initial values of the pseudo random sequence. Specifically, according to the aggregation level of the E-PDCCH, the base station may determine which of formula (2) to formula (4) is used to generate the initial value of the pseudo random sequence used by the E-PDCCH.

Preferably, for the E-PDCCHs of the same DCI format or the same aggregation level, the base station may generate the corresponding DMRS for the E-PDCCHs by using the same initial value of the pseudo random sequence.

According to the DCI format or the aggregation level, the base station determines different initial values of the pseudo random sequence for the E-PDCCHs of different DCI formats or aggregation levels, and then generates the DMRS, which can reduce interference between the E-PDCCHs of different DCI formats or aggregation levels, improve performance of channel estimation, and improve demodulation performance of the E-PDCCH.

The base station not only sends the E-PDCCH, but also sends the extended physical downlink shared channel (E-PDSCH) scheduled by the E-PDCCH. To send the E-PDSCH, the base station also needs to generate a DMRS for the E-PDSCH, and sends the DMRS to the UE so that the UE can demodulate the E-PDSCH.

Preferably, according to the initial value of the pseudo random sequence of the generated DMRS corresponding to the E-PDCCH and a preset mapping relationship, the base station may generate the initial value of the pseudo random sequence corresponding to the DMRS of the E-PDSCH, where the mapping relationship may be obtained by performing statistics and analysis for the actual application data. Compared with the prior art in which the base station directly generates an initial value of the pseudo random sequence of the DMRS for the E-PDSCH, this implementation manner can save resources.

Figure 4:
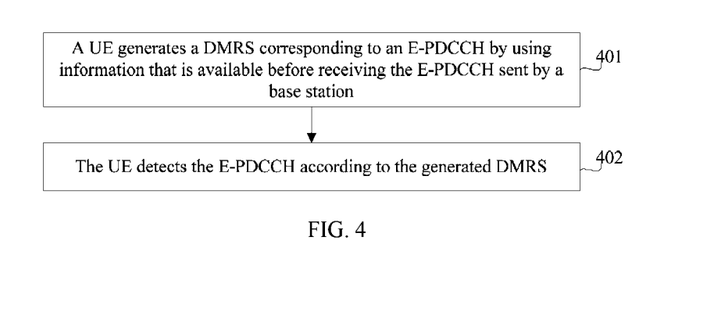
FIG. 4 is a flowchart of a DMRS processing method according to another embodiment of the present invention.

FIG. 4 is a flowchart of a DMRS processing method according to another embodiment of the present invention. As shown in FIG. 4, the method in this embodiment includes:

Step 401: A UE generates a DMRS corresponding to an E-PDCCH by using information that is available before receiving an E-PDCCH sent by a base station.

In this embodiment, the UE generates the DMRS by using a method adaptable to the base station. That is, by using information that is available before the UE receives the E-PDCCH rather than using an SCID, the UE generates the DMRS required for demodulating the E-PDCCH.

The DMRS in this embodiment refers to the DMRS generated by the UE by using pre-acquirable information, and required for demodulating the E-PDCCH.

Step 402: The UE detects the E-PDCCH according to the generated DMRS.

Specifically, when receiving the E-PDCCH, the UE generates the DMRS by using information that is available before receiving the E-PDCCH. Meanwhile, the UE may receive the DMRS sent by the base station. The DMRS sent by the base station is generated and sent by the base station according to the information that is available before the UE receives the E-PDCCH. For the process of the base station generating the DMRS, reference may be made to the description about the embodiments before FIG. 4, and no repeated description is given here any further.

The UE uses the DMRS generated by it to perform channel estimation, and obtains features of the channel for transmitting the E-PDCCH. Then, the UE detects the E-PDCCH according to a result of the channel estimation.

The UE does not know the time-and-frequency resource used by the E-PDCCH or the E-CCE carrying the E-PDCCH. Therefore, the UE needs to perform blind detection for possible CCE combinations until its own E-PDCCH is detected.

In this embodiment, by using the information that is available before receiving the E-PDCCH, the UE generates the DMRS required for demodulating the E-PDCCH, which solves the problem that the UE cannot generate the DMRS of the E-PDCCH by using the SCID and cannot demodulate the E-PDCCH, and enables demodulation of the E-PDCCH.

Figure 5:
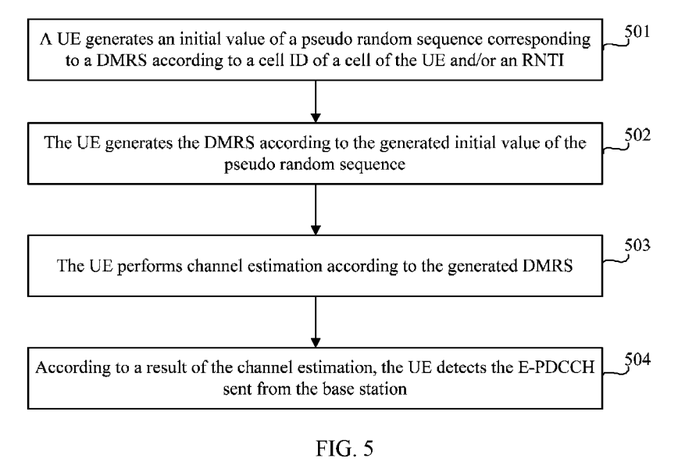
FIG. 5 is a flowchart of a DMRS processing method according to another embodiment of the present invention.

FIG. 5 is a flowchart of a DMRS processing method according to another embodiment of the present invention. As shown in FIG. 5, the method in the embodiment includes:

Step 501: A UE generates an initial value of a pseudo random sequence corresponding to a DMRS according to a cell ID of a cell of the UE and/or an RNTI.

Step 502: The UE generates the DMRS according to the generated initial value of the pseudo random sequence.

The process of the UE generating the initial value of the pseudo random sequence corresponding to the DMRS is similar to the process of the base station generating the initial value of the pseudo random sequence corresponding to the DMRS, and is not repeated here any further. Preferably, the UE may generate the initial value of the pseudo random sequence corresponding to the DMRS according to formula (2) or (3) or (4). The difference is: For the UE, $n_s$ in the formula is a sequence number of a receiving slot corresponding to the DMRS, that is, a sequence number of the slot that receives the DMRS sent by the base station.

The process of the UE generating the DMRS according to the initial value of the pseudo random sequence is similar to the process of the base station generating the DMRS according to the initial value of the pseudo random sequence, and is not repeated here any further. Preferably, the UE may also generate the DMRS according to formula (1).

If the base station generates the DMRS according to a maximum system bandwidth, correspondingly, the UE generates the DMRS according to the maximum system bandwidth, that is, the UE generates a DMRS of a length corresponding to the maximum system bandwidth. If the base station generates the DMRS according to a bandwidth occupied by the DMRS corresponding to the E-PDCCH, then correspondingly, the UE generates the DMRS according to the bandwidth occupied by the DMRS corresponding to the E-PDCCH, that is, the UE generates a DMRS of a length corresponding to a bandwidth occupied by a reference signal corresponding to the E-PDCCH.

Step 503: The UE performs channel estimation according to the generated DMRS.

Step 504: According to a result of the channel estimation, the UE detects the received E-PDCCH sent by the base station.

Specifically, if the UE generates the DMRS according to the maximum system bandwidth, the UE intercepts a corresponding sequence in the generated DMRS according to a resource location of the generated DMRS, and performs channel estimation according to the intercepted sequence, that is, detects the E-PDCCH according to the intercepted sequence.

If the UE generates the DMRS according to the bandwidth occupied by the DMRS corresponding to the E-PDCCH, the UE performs channel estimation directly according to the generated DMRS, that is, the UE detects the E-PDCCH directly according to the generated DMRS.

In this embodiment, by using the information that is available before receiving the E-PDCCH, the UE generates the DMRS required for demodulating the E-PDCCH, which solves the problem that the UE cannot generate the DMRS of the E-PDCCH by using an SCID and cannot demodulate the E-PDCCH, and enables demodulation of the E-PDCCH.

Further, if the base station uses the first implementation manner to generate the initial value of the pseudo random sequence corresponding to the DMRS, the process of the UE generating the initial value of the pseudo random sequence corresponding to the DMRS according to formula (2) or (3) or (4) includes:

performing, by the UE, blind detection for various combinations of E-CCEs; generating, by the UE, the initial value of the pseudo random sequence corresponding to the DMRS according to formula (2) or formula (3) if a result of the blind detection is that the total number of E-CCEs included in a resource set is greater than the number of E-CCEs carrying the E-PDCCH and included in the resource set; and, generating, by the UE, the initial value of the pseudo random sequence corresponding to the DMRS according to formula (4) if the result of the blind detection is that the total number of E-CCEs included in the resource set is less than or equal to the number of E-CCEs carrying the E-PDCCH and included in the resource set.

After dividing all E-CCEs according to a preset granularity to form resource sets, the base station notifies the UE of the total number of E-CCEs included in each resource set. That is, the UE knows the total number of E-CCEs in each resource set beforehand.

If the base station uses the second implementation manner to generate the initial value of the pseudo random sequence corresponding to the DMRS, the process of the UE generating the initial value of the pseudo random sequence corresponding to the DMRS according to formula (2) or (3) or (4) includes:

performing, by the UE, blind detection for various combinations of the E-CCEs; generating, by the UE, the initial value of the pseudo random sequence corresponding to the DMRS according to the formula (2) or (3) if a result of the blind detection is that the E-CCE carrying the E-PDCCH belongs to a common search space of a downlink control channel region that carries the E-PDCCH; and generating, by the UE, the initial value of the pseudo random sequence corresponding to the DMRS according to the formula (4) if the result of the blind detection is that the E-CCE carrying the E-PDCCH belongs to a user search space of the downlink control channel region that carries the E-PDCCH.

In conclusion, the DMRS processing method provided in each embodiment of the present invention has the following beneficial effects: 1. the DMRS is generated by using the information that is available before the UE receives the E-PDCCH, which solves the problem that the UE cannot generate the DMRS of the E-PDCCH according to the SCID, and enables demodulation of the E-PDCCH; and, 2. by various means such as the aggregation level, control channel element size, search space and DCI format, different initial values of the pseudo random sequence are generated for the DMRS of the E-PDCCH, which saves signaling, helps randomize interference properly, and improves performance of channel estimation and the demodulation performance of the E-PDCCH.

Figure 6:
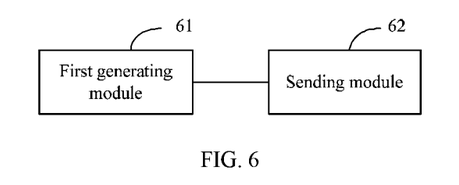
FIG. 6 is a schematic structural diagram of a base station according to an embodiment of the present invention.

FIG. 6 is a schematic structural diagram of a base station according to an embodiment of the present invention. As shown in FIG. 6, the base station in this embodiment includes a first generating module 61 and a sending module 62.

The first generating module 61 is configured to generate a DMRS corresponding to an E-PDCCH by using information that is available before a UE receives the E-PDCCH sent by the base station in this embodiment.

The sending module 62 is connected with the first generating module 61 and is configured to map the DMRS generated by the first generating module 61 onto a time-and-frequency resource corresponding to a downlink control channel region and used for transmitting a reference signal, and send the DMRS to the UE.

Functional modules of the base station in this embodiment may be configured to implement the procedure of the DMRS processing method shown in FIG. 1, and their specific working principles are not repeated here any further. For details, see the description in the method embodiment.

In this embodiment, the base station no longer uses an SCID to generate the DMRS required for demodulating the E-PDCCH, but generates the DMRS by using the information that is available before the UE receives the E-PDCCH; correspondingly, the UE also generates the DMRS before receiving the E-PDCCH based on the information that is available before receiving the E-PDCCH. In this way, the E-PDCCH is demodulated based on the generated DMRS, the defect that the UE cannot generate the DMRS based on the SCID in the same way as the prior art is overcome, and the issue of demodulating the E-PDCCH is solved.

Figure 7:
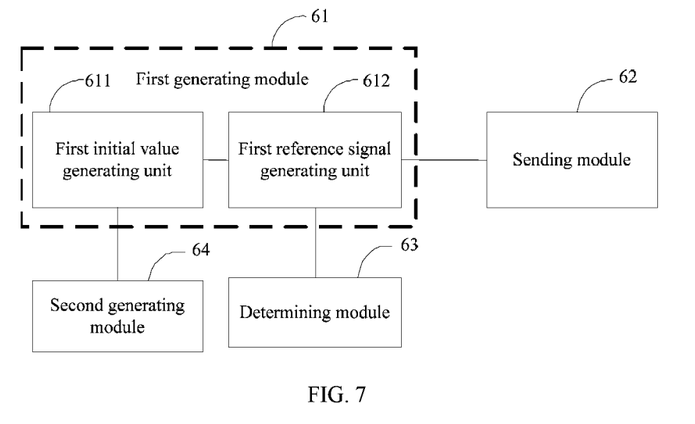
FIG. 7 is a schematic structural diagram of a base station according to another embodiment of the present invention.

FIG. 7 is a schematic structural diagram of a base station according to another embodiment of the present invention. The implementation of this embodiment is based on the embodiment shown in FIG. 6. As shown in FIG. 7, the base station in this embodiment includes a first generating module 61 and a sending module 62.

The first generating module 61 may specifically use formula (1) to generate a DMRS required for demodulating an E-PDCCH.

If $N_{RB}^{DL}$ in formula (1) is the number of resource blocks included in a maximum system bandwidth, the first generating module 61 is specifically configured to generate the DMRS according to the maximum system bandwidth, that is, the first generating module 61 generates a DMRS of a length corresponding to the maximum system bandwidth. Correspondingly, the sending module 62 is specifically configured to intercept a corresponding sequence in the DMRS according to a resource location of the DMRS, where the DMRS is generated by the first generating module 61, map the intercepted sequence onto a time-and-frequency resource corresponding to a downlink control channel region and used for transmitting a reference signal, and send the mapped sequence to the UE.

If $N_{RB}^{DL}$ in formula (1) is the number of resource blocks included in the bandwidth occupied by the reference signal corresponding to the E-PDCCH, the first generating module 61 generates the DMRS according to the bandwidth occupied by the DMRS corresponding to the E-PDCCH, that is, the first generating module 61 generates a DMRS of a length corresponding to the bandwidth occupied by the reference signal corresponding to the E-PDCCH. Correspondingly, the sending module 62 is specifically configured to directly map the DMRS generated by the first generating module 61 onto a time-and-frequency resource corresponding to a downlink control channel region and used for transmitting a reference signal, and send the DMRS to the UE.

Further, the first generating module 61 in this embodiment includes a first initial value generating unit 611 and a first reference signal generating unit 612.

The first initial value generating unit 611 is configured to generate an initial value of a pseudo random sequence corresponding to the DMRS according to a cell identifier of a cell of the UE and/or an RNTI.

The first reference signal generating unit 612 is connected with the first initial value generating unit 611 and the sending module 62, and is configured to generate the DMRS according to the initial value of the pseudo random sequence and deliver the generated DMRS to the sending module 62.

Further, the first initial value generating unit 611 is specifically configured to generate the initial value of the pseudo random sequence corresponding to the DMRS according to formula (2) or (3) or (4).

The RNTI in formula (2) or formula (3) or formula (4) may be, but without being limited to, a C-RNTI, an SI-RNTI, a P-RNTI, an RA-RNTI, a TPC-PUCCH-RNTI, or a TPC-PUSCH-RNTI.

Further, the first initial value generating unit 611 is specifically configured to: generate the initial value of the pseudo random sequence corresponding to the DMRS according to the formula (2) or (3) if the total number of E-CCEs included in a resource set is greater than the number of E-CCEs carrying the E-PDCCH and included in the resource set; and generate the initial value of the pseudo random sequence corresponding to the DMRS according to the formula (4) if the total number of E-CCEs included in the resource set is less than or equal to the number of E-CCEs carrying the E-PDCCH and included in the resource set.

The resource set in this embodiment may be a PRB, a PRB pair, a PRG, or an RBG.

Still further, the first initial value generating unit 611 in this embodiment may further be specifically configured to: generate the initial value of the pseudo random sequence corresponding to the DMRS according to formula (2) or formula (3) if the E-CCE carrying the E-PDCCH belongs a common search space; and generate the initial value of the pseudo random sequence corresponding to the DMRS according to formula (4) if the E-CCE carrying the E-PDCCH belongs a user search space.

Further, the base station in this embodiment not only includes the first generating module 61 and the sending module 62, but also includes a determining module 63.

The determining module 63 is connected with the first generating module 61, and more specifically, connected with the first reference signal generating unit 612, and is configured to determine the initial value of the pseudo random sequence used by the E-PDCCH according to a DCI format of the E-PDCCH or an aggregation level of the E-PDCCH if the corresponding DMRS is generated for E-PDCCHs of different DCI formats by using different initial values of the pseudo random sequence or if the corresponding DMRS is generated for E-PDCCHs of different aggregation levels by using different initial values of the pseudo random sequence, and deliver the determined result to the first reference signal generating unit 612.

Correspondingly, the first reference signal generating unit 612 is specifically configured to generate the DMRS corresponding to the E-PDCCH according to the initial value of the pseudo random sequence, where the initial value is determined by the determining module 63.

Further, the base station in this embodiment may further include a second generating module 64.

The second generating module 64 is connected with the first initial value generating unit 611, and is configured to generate, according to the initial value of the pseudo random sequence corresponding to the DMRS and a preset mapping relationship, where the initial value is generated by the first initial value generating unit 611, the initial value of the pseudo random sequence corresponding to the DMRS of an E-PDSCH scheduled by the E-PDCCH.

Functional modules or units described in the foregoing may be used to implement the DMRS processing method procedure performed by the base station, and their specific working principles are not repeated here any further.

In this embodiment, the base station no longer uses an SCID to generate the DMRS required for demodulating the E-PDCCH, but generates the DMRS by using the information that is available before the UE receives the E-PDCCH; correspondingly, the UE also generates the DMRS before receiving the E-PDCCH based on the information that is available before receiving the E-PDCCH. In this way, the E-PDCCH is demodulated based on the generated DMRS, the defect that the UE cannot generate the DMRS based on the SCID in the same way as the prior art is overcome, and the issue of demodulating the E-PDCCH is solved.

Figure 8:
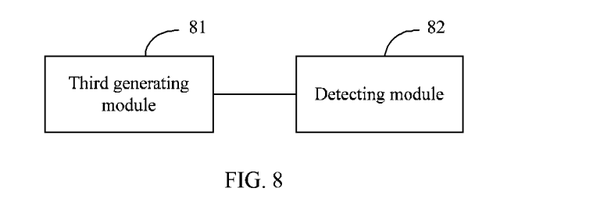
FIG. 8 is a schematic structural diagram of a UE according to an embodiment of the present invention.

FIG. 8 is a schematic structural diagram of a UE according to an embodiment of the present invention. As shown in FIG. 8, the UE in this embodiment includes a third generating module 81 and a detecting module 82.

The third generating module 81 is configured to generate a DMRS corresponding to an E-PDCCH by using information that is available before receiving the E-PDCCH sent by a base station.

The detecting module 82 is connected with the third generating module 81, and is configured to detect the E-PDCCH according to the DMRS generated by the third generating module 81.

Functional modules of the UE in this embodiment may be used to implement the procedure of the DMRS processing method shown in FIG. 4, and their specific working principles are not repeated here any further. For details, see the description in the method embodiment.

The UE in this embodiment collaborates with the base station provided in an embodiment of the present invention, and, by using the information that is available before receiving the E-PDCCH, the UE generates the DMRS required for demodulating the E-PDCCH, which solves the problem that the UE cannot generate the DMRS of the E-PDCCH by using an SCID and cannot demodulate the E-PDCCH, and enables demodulation of the E-PDCCH.

Figure 9:
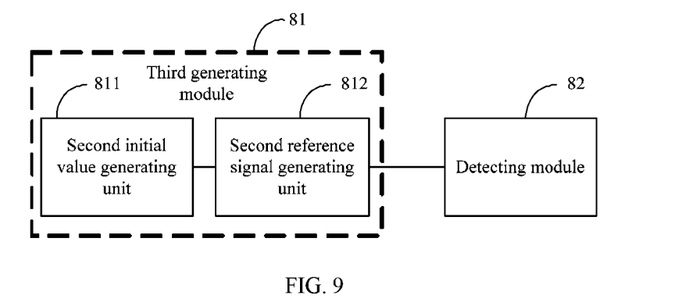
FIG. 9 is a schematic structural diagram of a UE according to another embodiment of the present invention.

FIG. 9 is a schematic structural diagram of a UE according to another embodiment of the present invention. The implementation of this embodiment is based on the embodiment shown in FIG. 8. As shown in FIG. 9, the UE in this embodiment also includes a third generating module 81 and a detecting module 82.

The third generating module 81 may use formula (1) to generate a DMRS required for demodulating an E-PDCCH.

If $N_{RB}^{DL}$ in formula (1) is the number of resource blocks included in a maximum system bandwidth, the third generating module 81 is specifically configured to generate the DMRS according to the maximum system bandwidth, that is, the third generating module 81 generates a DMRS of a length corresponding to the maximum system bandwidth. Correspondingly, the detecting module 82 is specifically configured to intercept a corresponding sequence in the DMRS according to a resource location of the DMRS, where the DMRS is generated by the third generating module 81, and detect the E-PDCCH according to the intercepted sequence.

If $N_{RB}^{DL}$ in formula (1) is the number of resource blocks included in a bandwidth occupied by a reference signal corresponding to the E-PDCCH, the third generating module 81 generates the DMRS according to the bandwidth occupied by the DMRS corresponding to the E-PDCCH, that is, the third generating module 81 generates a DMRS of a length corresponding to the bandwidth occupied by the reference signal corresponding to the E-PDCCH. Correspondingly, the detecting module 82 is specifically configured to detect the E-PDCCH directly according to the DMRS generated by the third generating module 81.

Further, the third generating module 81 in this embodiment includes a second initial value generating unit 811 and a second reference signal generating unit 812.

The second initial value generating unit 811 is configured to generate an initial value of a pseudo random sequence corresponding to the DMRS according to a cell identifier of a cell of the UE and/or an RNTI.

The second reference signal generating unit 812 is connected with the second initial value generating unit 811 and the detecting module 82, and is configured to generate the DMRS according to the initial value of the pseudo random sequence, where initial value is generated by the second initial value generating unit 811, and deliver the generated DMRS to the detecting module 82.

Further, the second initial value generating unit 811 is specifically configured to generate the initial value of the pseudo random sequence corresponding to the DMRS according to formula (2) or (3) or (4).

The RNTI in formula (2) or formula (3) or formula (4) may be, but without being limited to, a C-RNTI, an SI-RNTI, a P-RNTI, an RA-RNTI, a TPC-PUCCH-RNTI, or a TPC-PUSCH-RNTI.

Further, the second initial value generating unit 811 is specifically configured to: generate the initial value of the pseudo random sequence corresponding to the DMRS according to the formula (2) or (3) if the total number of E-CCEs included in a resource set is greater than the number of E-CCEs carrying the E-PDCCH and included in the resource set; and generate the initial value of the pseudo random sequence corresponding to the DMRS according to the formula (4) if the total number of E-CCEs included in the resource set is less than or equal to the number of E-CCEs carrying the E-PDCCH and included in the resource set, The resource set in this embodiment may be a PRB, a PRB pair, a PRG, or an RBG.

Still further, the second initial value generating unit 811 in this embodiment may be specifically configured to: generate the initial value of the pseudo random sequence corresponding to the DMRS according to formula (2) or formula (3) if the E-CCE carrying the E-PDCCH belongs a common search space; and generate the initial value of the pseudo random sequence corresponding to the DMRS according to formula (4) if the E-CCE carrying the E-PDCCH belongs a user search space.

Functional modules or units described in the foregoing may be used to implement the DMRS processing method procedure performed by the UE, and their specific working principles are not repeated here any further.

The UE in this embodiment collaborates with the base station provided in an embodiment of the present invention, and, by using the information that is available before receiving the E-PDCCH, the UE generates the DMRS required for demodulating the E-PDCCH, which solves the problem that the UE cannot generate the DMRS of the E-PDCCH by using an SCID and cannot demodulate the E-PDCCH, and enables demodulation of the E-PDCCH.

A person of ordinary skill in the art may understand that, all or a part of the steps of the foregoing method embodiments may be implemented by a program instructing relevant hardware. The aforementioned program may be stored in a computer readable storage medium. When the program runs, the steps of the forgoing method embodiments are performed. The storage medium includes any medium capable of storing program code, such as a ROM, a RAM, a magnetic disk, or an optical disc.

Finally, it should be noted that the foregoing embodiments are merely intended for describing the technical solutions of the present invention rather than limiting the present invention. Although the present invention is described in detail with reference to the foregoing embodiments, persons of ordinary skill in the art should understand that they may still make modifications to the technical solutions described in the foregoing embodiments, or make equivalent replacements to some or all the technical features thereof, as long as such modifications and replacements do not cause the essence of corresponding technical solutions to depart from the scope of the technical solutions of the embodiments of the present invention.

What is claimed is:

1. A demodulation reference signal (DMRS) processing method comprising:

generating, by a base station, a DMRS corresponding to an extended physical downlink control channel (E-PDCCH) according to an initial value of pseudo random sequence information that is available before a user equipment (UE) receives the E-PDCCH sent by the base station;

mapping, by the base station, the DMRS onto a time-and-frequency resource corresponding to a downlink control channel region for use in transmitting a reference signal;

sending the DMRS to the UE; and determining, by the base station, the initial value of a pseudo random sequence used to generate the DMRS according to (a) a downlink control information (DCI) format of the E-PDCCH or (b) an aggregation level of the E-PDCCH and according to one of the following relationships:

$$c_{init} = \lfloor n_s/2 \rfloor 2^9 + N_{ID}^{cell}; \quad (a)$$

$$c_{init} = (\lfloor n_s/2 \rfloor + 1) \cdot (2N_{ID}^{cell} + 1) \cdot 2^9 + N_{ID}^{cell}; \quad (b)$$

and $$c_{init} = (\lfloor n_s/2 \rfloor + 1) \cdot (2N_{ID}^{cell} + 1) \cdot 2^{16} + n_{RNTI}, \quad (c)$$

where $c_{init}$ is the initial value of the pseudo random sequence, $n_s$ is a sequence number of a slot for transmitting the DMRS, RNTI is a radio network temporary identifier and $N_{ID}^{cell}$ is a cell ID of a cell of the UE, such that different DCI formats or different aggregation levels of the E-PDCCH determine different initial values of the pseudo random sequence.

2. The DMRS processing method according to claim 1, wherein the generating, by the base station, the DMRS corresponding to the E-PDCCH according to the information that is available before the UE receives the E-PDCCH sent by the base station, further comprises:
generating, by the base station, according to a bandwidth occupied by the DMRS corresponding to the E-PDCCH, the DMRS of a length corresponding to the bandwidth occupied by the DMRS corresponding to the E-PDCCH; and
wherein mapping the DMRS onto the time-and-frequency resource corresponding to the downlink control channel region for use in transmitting the reference signal, and sending the DMRS to the UE comprises mapping, by the base station, the DMRS directly onto the time-and-frequency resource corresponding to the downlink control channel region.

3. A demodulation reference signal (DMRS) processing method comprising:
before receiving an extended physical downlink control channel (E-PDCCH) sent by a base station, generating, by a user equipment (UE), a DMRS required to demodulate the E-PDCCH according to network information that is available to both the UE and the base station, where the network information includes an initial value of a pseudo random sequence;
detecting, by the UE, the E-PDCCH according to the DMRS;
determining, by the UE, the initial value of the pseudo random sequence for generating the DMRS according to (a) a downlink control information (DCI) format of the E-PDCCH or (b) an aggregation level of the E-PDCCH and according to one of the following relationships:

$$c_{init} = \lfloor n_s/2 \rfloor 2^9 + N_{ID}^{cell}; \quad (a)$$

$$c_{init} = (\lfloor n_s/2 \rfloor + 1) \cdot (2N_{ID}^{cell} + 1) \cdot 2^9 + N_{ID}^{cell}; \quad (b)$$

and $$c_{init} = (\lfloor n_s/2 \rfloor + 1) \cdot (2N_{ID}^{cell} + 1) \cdot 2^{16} + n_{RNTI}, \quad (c)$$

where $c_{init}$ is the initial value of the pseudo random sequence, $n_s$ is a sequence number of a slot for transmitting the DMRS, RNTI is a radio network temporary identifier and $N_{ID}^{cell}$ is a cell ID of a cell of the UE, such that different DCI formats or different aggregation levels of the E-PDCCH determine different initial values of the pseudo random sequence.

4. The DMRS processing method according to claim 3, wherein the detecting, by the UE, the E-PDCCH according to the DMRS, further comprises:
performing, by the UE, channel estimation according to the DMRS; and
detecting, by the UE, the E-PDCCH according to a result of the channel estimation.

5. The DMRS processing method according to claim 3, wherein the generating, by the UE, the DMRS corresponding to the E-PDCCH comprises:
generating, by the UE, according to the bandwidth occupied by the DMRS corresponding to the E-PDCCH, the DMRS of a length corresponding to the bandwidth occupied by the DMRS corresponding to the E-PDCCH; and
wherein the detecting, by the UE, the E-PDCCH according to the DMRS, comprises detecting, by the UE, the E-PDCCH directly according to the DMRS.

6. A base station comprising a processing hardware platform executing instructions stored on a non-transitory processor-readable medium to configure the processing hardware platform to:
generate a demodulation reference signal (DMRS) required to demodulate an extended physical downlink control channel (E-PDCCH) according to network information that is available to both the UE and the base station before sending the E-PDCCH to a user equipment (UE), where the network information includes an initial value of pseudo random sequence information; and
map the DMRS onto a time-and-frequency resource corresponding to a downlink control channel region for use in transmitting a reference signal; and
send the DMRS to the UE; and
determining the initial value of a pseudo random sequence used to generate the DMRS according to (a) a downlink control information (DCI) format of the E-PDCCH or (b) an aggregation level of the E-PDCCH and according to one of the following relationships:

$$c_{init} = \lfloor n_s/2 \rfloor 2^9 + N_{ID}^{cell}; \quad (a)$$

$$c_{init} = (\lfloor n_s/2 \rfloor + 1) \cdot (2N_{ID}^{cell} + 1) \cdot 2^9 + N_{ID}^{cell}; \quad (b)$$

and $$c_{init} = (\lfloor n_s/2 \rfloor + 1) \cdot (2N_{ID}^{cell} + 1) \cdot 2^{16} + n_{RNTI}, \quad (c)$$

where $c_{init}$ is the initial value of the pseudo random sequence, $n_s$ is a sequence number of a slot for transmitting the DMRS, RNTI is a radio network temporary identifier and $N_{ID}^{cell}$ is a cell ID of a cell of the UE, such that different DCI formats or different aggregation levels of the E-PDCCH determine different initial values of the pseudo random sequence.

7. The base station according to claim 6, wherein the processing platform is further configured to:
generate, according to a bandwidth occupied by the DMRS corresponding to the E-PDCCH, the DMRS of a length corresponding to the bandwidth occupied by the DMRS corresponding to the E-PDCCH; and
directly map the DMRS onto the time-and-frequency resource corresponding to the downlink control channel region and used for transmitting the reference signal; and
send the DMRS to the UE.

8. A user equipment (UE) comprising a processor and a non-transitory processor-readable medium having processor-executable instructions stored thereon, the processor-executable instructions executed by the processor to configure the processor to:
generate a demodulation reference signal (DMRS) required to demodulate the E-PDCCH using network information that is available to both the UE and the base station before receiving an extended physical downlink control channel (E-PDCCH) sent by a base station, where the network information includes an initial value of a pseudo random sequence; and detect the E-PDCCH according to the DMRS;

determining the initial value of the pseudo random sequence for generating the DMRS according to (a) a downlink control information (DCI) format of the E-PDCCH or (b) an aggregation level of the E-PDCCH and according to one of the following relationships:

$$c_{init}=\lfloor n_s/2 \rfloor 2^9 + N_{ID}^{cell};\qquad(a)$$

$$c_{init}=(\lfloor n_s/2 \rfloor+1)\cdot(2N_{ID}^{cell}+1)\cdot 2^9 + N_{ID}^{cell};\qquad(b)$$

and $$c_{init}=(\lfloor n_s/2 \rfloor+1)\cdot(2N_{ID}^{cell}+1)\cdot 2^{16} + n_{RNTI},\qquad(c)$$

where $c_{init}$ is the initial value of the pseudo random sequence, $n_s$ is a sequence number of a slot for transmitting the DMRS, RNTI is a radio network temporary identifier and $N_{ID}^{cell}$ is a cell ID of a cell of the UE, such that different DCI formats or different aggregation levels of the E-PDCCH determine different initial values of the pseudo random sequence.

9. The UE according to claim 8, wherein the processor is further configured to:

perform channel estimation according to the DMRS; and
detect the E-PDCCH according to the channel estimation.

10. The UE according to claim 8, wherein the processor is further configured to generate, according to a bandwidth occupied by the DMRS corresponding to the E-PDCCH, the DMRS of a length corresponding to the bandwidth occupied by the DMRS corresponding to the E-PDCCH; and detect the E-PDCCH directly according to the DMRS.

11. The method according to claim 1, wherein the network information that is available to both the UE and the base station before the E-PDCCH arrives at the UE includes a cell identification (ID) or a radio network temporary identifier (RNTI).

12. The method according to claim 3, network information that is available to both the UE and the base station before the E-PDCCH arrives at the UE includes a cell identification (ID) or a radio network temporary identifier (RNTI).

13. The method according to claim 1, wherein the different DCI formats or different aggregation levels of the E-PDCCH determine which of the relationships (a), (b) or (c) are used to determine the initial value of the pseudo random sequence.

14. The method according to claim 3, wherein the different DCI formats or different aggregation levels of the E-PDCCH determine which of the relationships (a), (b) or (c) are used to determine the initial value of the pseudo random sequence.

15. The base station according to claim 6, wherein the processing hardware platform is further configured to select the relationship (a), (b) or (c) for determining the initial value of the pseudo random sequence based on different DCI formats or different aggregation levels of the E-PDCCH.

16. The UE according to claim 8, wherein the processor is further configured to select the relationship (a), (b) or (c) for determining the initial value of the pseudo random sequence based on different DCI formats or different aggregation levels of the E-PDCCH.

* * * * *

UNITED STATES PATENT AND TRADEMARK OFFICE
CERTIFICATE OF CORRECTION

PATENT NO. : 10,158,471 B2
APPLICATION NO. : 14/448187
DATED : December 18, 2018
INVENTOR(S) : Kunpeng Liu et al.

Page 1 of 1

It is certified that error appears in the above-identified patent and that said Letters Patent is hereby corrected as shown below:

Claim 1, Column 17, Line 6 should read -- $c_{init} = (\lfloor n_s/2 \rfloor + 1) \cdot (2 N_{ID}^{cell} + 1) \cdot 2^{16} + n_{RNTI}$ --

Claim 3, Column 17, Line 55 should read -- $c_{init} = (\lfloor n_s/2 \rfloor + 1) \cdot (2 N_{ID}^{cell} + 1) \cdot 2^{16} + n_{RNTI}$ --

Claim 6, Column 18, Line 42 should read -- $c_{init} = (\lfloor n_s/2 \rfloor + 1) \cdot (2 N_{ID}^{cell} + 1) \cdot 2^{16} + n_{RNTI}$ --

Claim 8, Column 19, Line 18 should read -- $c_{init} = (\lfloor n_s/2 \rfloor + 1) \cdot (2 N_{ID}^{cell} + 1) \cdot 2^{16} + n_{RNTI}$ --

Signed and Sealed this
Seventeenth Day of September, 2019

Andrei Iancu
*Director of the United States Patent and Trademark Office*